US008824792B2

(12) United States Patent
Frye et al.

(10) Patent No.: US 8,824,792 B2
(45) Date of Patent: Sep. 2, 2014

(54) IMAGE ELEMENT BRIGHTNESS ADJUSTMENT

(75) Inventors: Fred Frye, Simpsonville, SC (US); Dong-Hyuk Jang, Seoul (KR); Sang-Gon Lee, Yongin (JP)

(73) Assignee: IB Korea Ltd. (KR)

( * ) Notice: Subject to any disclaimer, the term of this patent is extended or adjusted under 35 U.S.C. 154(b) by 148 days.

(21) Appl. No.: 13/557,349

(22) Filed: Jul. 25, 2012

(65) Prior Publication Data

US 2014/0029847 A1 Jan. 30, 2014

(51) Int. Cl.
*G06K 9/00* (2006.01)

(52) U.S. Cl.
USPC .......................................................... 382/167

(58) Field of Classification Search
CPC ... G06K 9/00; G06K 9/00013; G06K 9/0002; G06K 9/00067; G06K 9/00073; G06K 9/0008; G06K 9/0036; G06K 9/56; G06F 3/03; G06F 3/03547; G06F 19/00; G06F 21/32; G06F 2203/0338; G06T 7/00; G06T 7/0083; G06T 7/0091; G06T 2207/20036; G06T 2207/20192; G06T 2207/30088; H04N 1/6027; H04N 9/68; G01N 29/34
See application file for complete search history.

(56) References Cited

U.S. PATENT DOCUMENTS

| | | | |
|---|---|---|---|
| 6,002,786 A | 12/1999 | Hallibert et al. | |
| 6,326,644 B1 | 12/2001 | Lee et al. | |
| 6,445,811 B1 * | 9/2002 | Wada | 382/125 |
| 6,688,186 B2 | 2/2004 | Chae | |
| 6,952,490 B2 | 10/2005 | Lee | |
| 6,990,218 B2 * | 1/2006 | Wirtz | 382/124 |
| 6,993,164 B2 | 1/2006 | Jang | |
| 7,248,298 B2 | 7/2007 | Lee | |
| 7,602,988 B2 * | 10/2009 | Li | 382/254 |
| 7,929,031 B2 | 4/2011 | Nakayama | |
| 8,385,644 B2 * | 2/2013 | Stojancic | 382/170 |

(Continued)

FOREIGN PATENT DOCUMENTS

| | | |
|---|---|---|
| CN | ZL02146245.3 | 6/2005 |
| CN | 101656299 A | 2/2010 |

(Continued)

OTHER PUBLICATIONS

PCT International Search Report and Written Opinion from International Application PCT/US2013/050852, mailed on Nov. 13, 2013, 12 pages.

*Primary Examiner* — Jose Couso
(74) *Attorney, Agent, or Firm* — Brouse McDowell; Heather M. Barnes; Michael G. Craig

(57) ABSTRACT

One or more techniques and/or systems are disclosed for adjusting a brightness level of an image element representing an image of a body-part relief print. A first weighting factor can be determined for a first image element that may be comprised in an initial image captured by a body-part relief print image capture device. A body-part relief print weighting value can be determined, which can be based at least upon a combination of the first weighting factor and a second image element brightness value for a second image element that may be comprised in a body-part relief print image, which may be captured by a same body-part relief print image capture device as the initial image. An adjusted brightness level can be determined for the second image element, based at least upon a combination of the body-part relief print weighting value and the second image element brightness value.

20 Claims, 12 Drawing Sheets

(56) References Cited

U.S. PATENT DOCUMENTS

| | | | |
|---|---|---|---|
| 8,457,924 B2 * | 6/2013 | Schneider et al. | 702/150 |
| 8,606,012 B2 * | 12/2013 | Suzuki et al. | 382/190 |
| 2002/0018252 A1 | 2/2002 | Lee et al. | |
| 2003/0068073 A1 | 4/2003 | Wirtz | |
| 2008/0055681 A1 | 3/2008 | Li | |
| 2008/0298650 A1 | 12/2008 | Jang et al. | |
| 2010/0142790 A1 | 6/2010 | Chang | |
| 2012/0106808 A1 | 5/2012 | Morioka et al. | |

FOREIGN PATENT DOCUMENTS

| | | |
|---|---|---|
| EP | 1624412 A1 | 2/2006 |
| JP | 3544940 | 4/2004 |
| KR | 10-0285130 | 12/2000 |
| KR | 10-0290954 | 3/2001 |
| KR | 10-0290955 | 3/2001 |
| KR | 10-0302025 | 6/2001 |
| KR | 10-0302026 | 6/2001 |
| KR | 10-0305519 | 7/2001 |
| KR | 10-0309738 | 9/2001 |
| KR | 10-0324130 | 1/2002 |
| KR | 10-0343065 | 6/2002 |
| KR | 10-0345282 | 7/2002 |
| KR | 10-0345283 | 7/2002 |
| KR | 10-0348520 | 7/2002 |
| KR | 10-0349113 | 8/2002 |
| KR | 10-0349415 | 8/2002 |
| KR | 10-0350023 | 8/2002 |
| KR | 10-0378994 | 3/2003 |
| KR | 10-0380836 | 4/2003 |
| KR | 10-0436376 | 6/2004 |
| KR | 10-0439633 | 6/2004 |
| KR | 10-0460825 | 12/2004 |
| KR | 10-0465136 | 12/2004 |
| KR | 10-0466287 | 1/2005 |
| KR | 10-0467279 | 1/2005 |
| KR | 10-0560347 | 3/2006 |
| KR | 10-0879381 | 1/2009 |
| TW | 131132 | 9/2001 |
| TW | I228239 | 2/2005 |

* cited by examiner

IMAGE ELEMENT BRIGHTNESS ADJUSTMENT

BACKGROUND

This invention pertains to the art of methods and systems for capturing body-part relief print images, such as fingerprint and/or handprint relief images, for example. Body-part relief print image capture devices, such as scanners and/or readers, are relatively common place in security related professions, and have become readily available to consumers who may wish to secure information, systems, and the like. Body-part relief print image capture devices typically capture an image of the relief print using some type of image capture device (e.g., camera, sensor, etc.), where merely the relief print portion of the body-part in question is represented in a resulting image.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Body-part relief print image devices and/or resulting images may be affected by external (e.g., environmental, localized dirt, debris, moisture, etc.) and/or internal (e.g., device defects, such as scratches, damaged sensors, etc.) conditions, which may provide less than desirable results when attempting to effectively utilize the resulting images. Accordingly, among other things, one or more techniques and/or systems are disclosed for mitigating image defects that may be a result of external and/or internal conditions.

In one implementation of identifying an adjusted brightness level for an image element representing at least a portion of an image of a body-part relief print, a first weighting factor can be determined for a first image element that may be comprised in an initial image. Further, a body-part relief print weighting value may be determined, where the body-part relief print weighting value can be based at least upon a combination of the first weighting factor and a second image element brightness value for a second image element that may be comprised in a body-part relief print image. Additionally, an adjusted brightness level can be determined for the second image element, based at least upon a combination of the body-part relief print weighting value and the second image element brightness value.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

Figure 1:
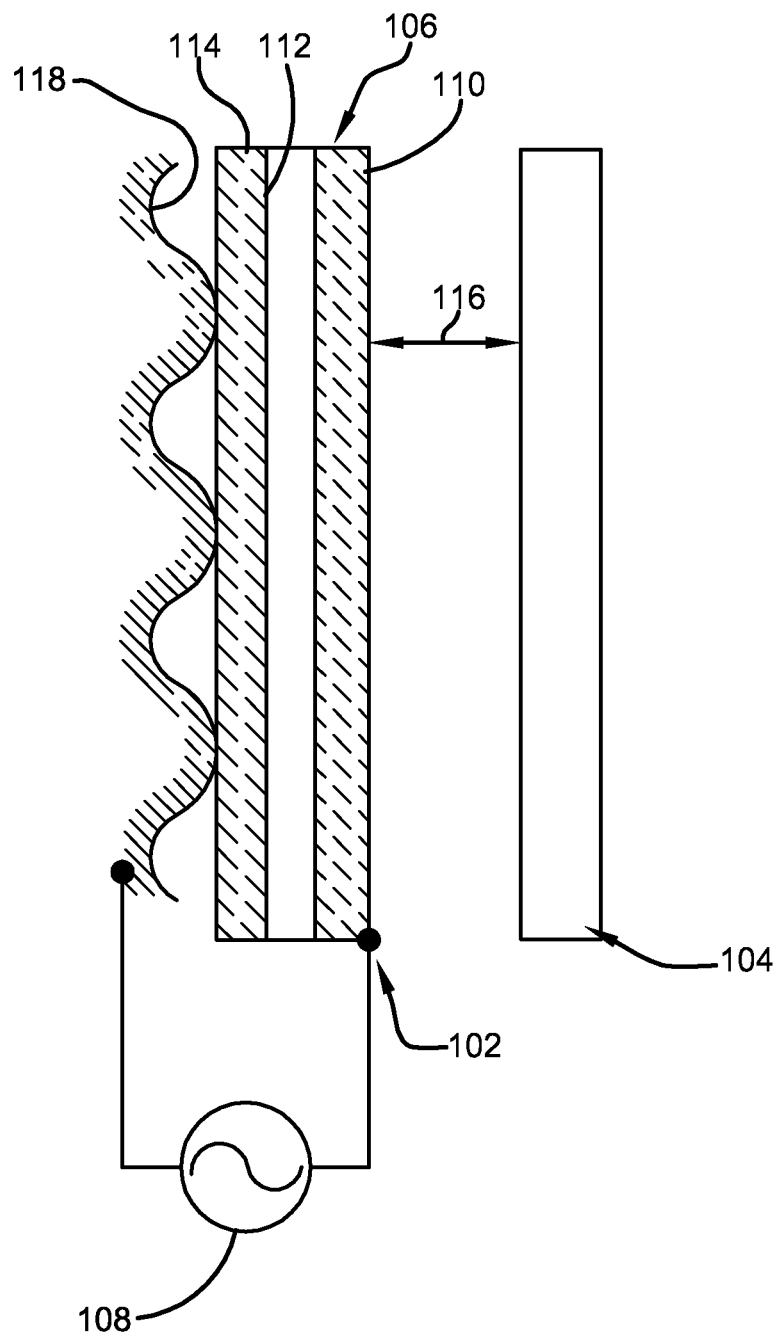
FIG. 1 is a component diagram illustrating an example body-part relief print recognition environment where one or more portions of one or more techniques and/or one or more systems described herein may be implemented.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

FIG. 1 is a component diagram illustrating an example body-part relief print recognition environment 100 where one or more portions of one or more techniques and/or one or more systems described herein may be implemented. As shown in the example environment 100, an example body-part relief print recognition system, such as a fingerprint recognition system, may comprise a relief print generator 102, and may further comprise a sensor arrangement 104. In one implementation, the sensor arrangement 104 may comprise a type of image capture component, such as an active pixel sensor (e.g., a CMOS sensor, and/or thin film transistor (TFT)), any digital image capture device (e.g., a CCD device), and/or any suitable image capture device (e.g., light sensitive film camera).

In one implementation, the relief print generator 102 may comprise an electrode-based (e.g., single electrode), electro-luminescence component 106, and/or an electrical connection 108 (e.g., a power source, such as an A/C source), which may provide an electrical connection between a relief object 118 and the electro-luminescence component 106. Further, in one implementation, the electrode-based, electro-luminescence component 106 may comprise a transparent electrode 110, a luminescent layer 112, and/or a dielectric layer 114. In one implementation, the relief print generator 102 and the sensor arrangement 104 may be separated at a distance 116 to each other or may be arranged such that the sensor arrangement 104 is in contact with the relief print generator 102. As one example, when a relief print recognition system is activated (e.g., by placing a finger at an image capture location) light produced by the luminescent layer 106 is emitted in respective directions. In this example, the emitted light can be reflected off the dielectric layer 114, and directed toward the sensor arrangement 104.

As provided herein, a method may be devised that provides for mitigating image defects in a body-part relief print image, such as a fingerprint image, which may be a result of external conditions (e.g., dirt or dust on a capture device and/or body part, less than desirable environmental conditions, and/or less than desirable image capture conditions) and/or device defects (e.g., scratches, damage, defective parts, operating outside of device parameters, etc.). As one example, an image defect may comprise a variation in brightness between neighboring image elements (e.g., pixels or sub-pixels), where a first image element expresses a higher brightness value (e.g., on a gray-scale) than a second image element due to some external and/or internal defect.

Figure 2:
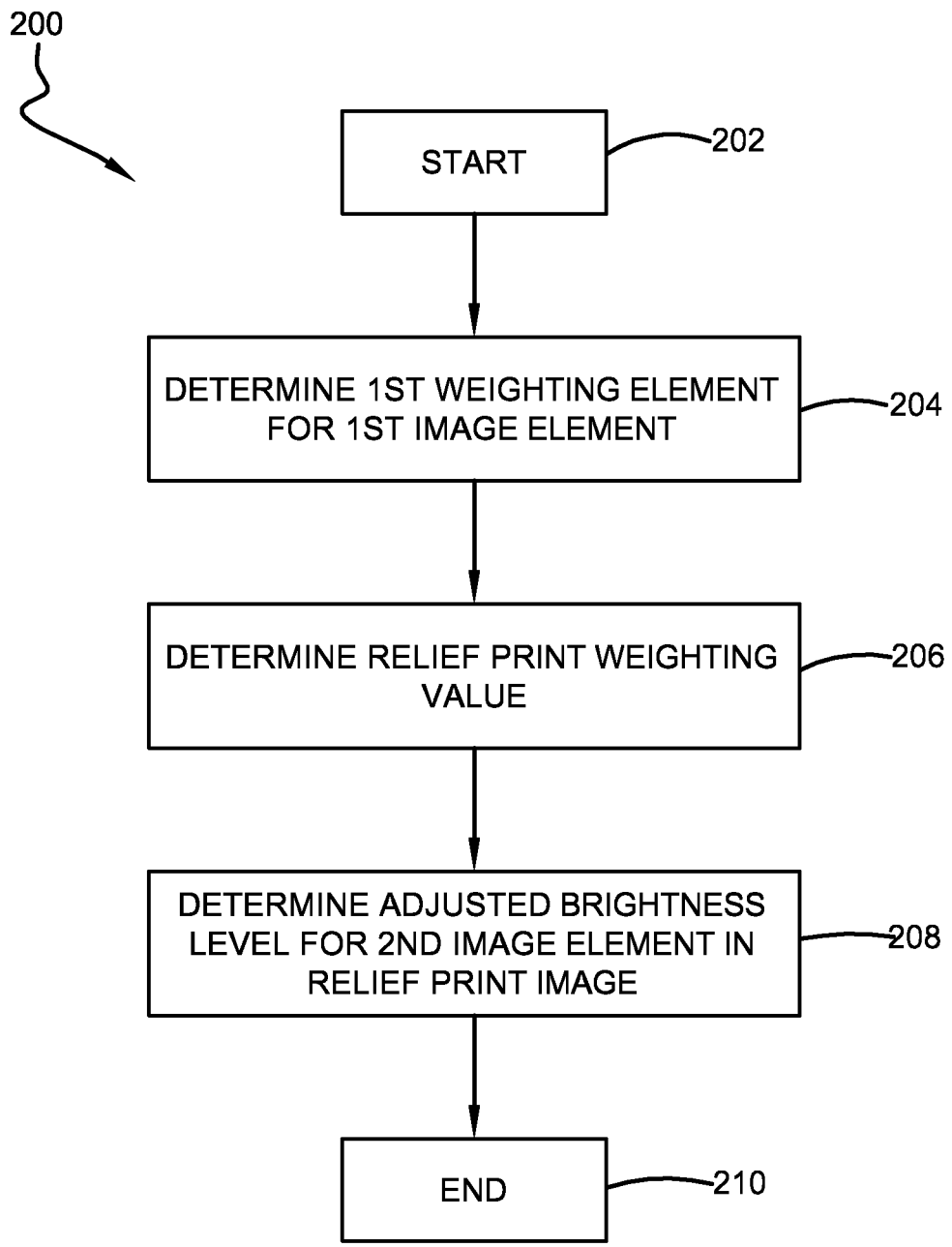
FIG. 2 is a flow diagram illustrating an exemplary method for identifying an adjusted brightness level for an image element in an image.

FIG. 2 is a flow diagram illustrating an exemplary method 200 for identifying an adjusted brightness level for an image element in an image. The exemplary method 200 begins at 202. At 204, a first weighting factor is determined for a first image element that is comprised in an initial image. In one implementation, the initial image can comprise an image captured by a body-part relief print imaging device (e.g., a fingerprint and/or handprint reader) without a body-part present. As one example, a device standard (e.g., a calibration standard, such as a blank, body-part stand-in piece) may be placed on a scanning portion of the device, and the initial image may be captured (e.g., of the calibration standard). As an example, where an electro-luminescent imaging film is used by the imaging device to illuminate relief areas of a body-part print, the initial image may be indicative of relatively complete coverage of an activation of the film within a relief print capture area of the device (e.g., all of the film is illuminated over the capture area). In this way, for example, if defects are present, they may be more readily identified in the initial image.

In one implementation, an image may comprise of one or more image elements that comprise a smallest element in an image that can be represented and/or controlled. As one example, an image element may comprise a pixel. Often, "pixel" is used to describe a unit of an image, for example, where the unit may comprise a smallest element of the image that can be represented and/or managed. As another example, a pixel may comprise an addressable screen element of a display device (e.g., screen pixel, sub-pixel), a single point in a raster image, and/or a single point in a printed picture. Further, as an example, a "pixel" may comprise an "address" corresponding to coordinates (e.g., X, Y coordinates, row and column coordinates, Euclidean space coordinates, etc.) for the image, and/or display screen. In one implementation, the image element may comprise any type of image "unit" (e.g., pixel, sub-pixel, etc.) that can be represented and/or controlled. Typically, for example, an image can be comprised of a plurality of pixels, arranged in rows and/or columns (e.g., or some other pattern), to create objects (e.g., relief prints and/or portions of relief prints), colors, shades, tones, etc., within the image.

Additionally, in one implementation, the first weighting factor can comprise an indication of the corresponding image element's condition, relative to a potential defect. That is, for example, a portion of an image sensor in the image capture device may comprise the corresponding image element, and that portion of the sensor may comprise a defect that results in a reduced "brightness" of a captured image. In this implementation, for example, the weighting factor may be indicative of the reduced "brightness" of the corresponding image element. As another example, a first portion of an electro-luminescent imaging film may illuminate less brightly than a second portion of the film. In this example, image elements comprised by areas of the first portion may comprise different (e.g., higher) weighting factors than image elements comprised by areas of the second portion.

At 206 in the exemplary implementation 200, of FIG. 2, a body-part relief print weighting value is determined, based at least upon a combination of the first weighting factor and a second image element brightness value for a second image element comprised in a body-part relief print image. In one implementation, a body-part relief print image may be captured subsequent (e.g., or prior) to capture of the initial image. In this way, for example, potential external and/or internal defects that may be present during the initial image capture (e.g., resulting in initial image defects) may also be present during the relief print image capture. Further, in this implementation, the body-part relief print image can comprise one or more image elements (e.g., comprising at least the second image element), for example. In this example, an image element brightness value may be identified for the respective one or more image elements (e.g., including the second image element).

In one implementation, an image element brightness value may comprise a color scale value, such as a gray-scale value. For example, a gray scale may comprise two-hundred and fifty six (e.g., zero to two-hundred and fifty-five, inclusive) gradient values, where a lowest value indicates a lowest level of brightness (e.g., no white color, merely black), and a highest value indicates a highest level of brightness (e.g., merely white, no black color) in a resulting image (e.g., displayed and/or printed). As another example, a color-scale (e.g., or portion thereof, such as a red scale from an RGB color scale) may comprise gradient values that also comprise a highest and lowest brightness level (e.g., or color level). In this implementation, as an example, respective image elements in the body-part relief print image may comprise a corresponding image element brightness value, which can be identified by comparing with associated color scale gradient values.

In one implementation, the image element brightness value (e.g., the second image element brightness value) can be combined with (e.g., multiplied by) the first weighting factor (e.g., for the first image element), resulting in the body-part relief print weighting value (e.g., for the second image element). As one example, the first image element may comprise a first position in the initial image, and the second image element may comprise a second position in the relief image, and the first and second positions may comprise a same position when the initial image and the relief image are overlaid. In this example, the first weighting factor from image element of the initial image is applied to the brightness value of second image element of the relief image, resulting in the weighting value for the body-part relief print image for the associated image element (e.g., the second image element). Further, a body-part relief print weighting value may be determined for the respective one or more image elements comprise in the body-part relief print image, for example, using the corresponding first weighting factor from the initial image, and the image element brightness value from the body-part relief print image.

At 208 in the exemplary implementation 200, of FIG. 2, an adjusted brightness level is determined for the second image element, based at least upon a combination of the body-part relief print weighting value and the second image element brightness value. In one implementation, the body-part relief print weighting value determined for the second image element can be combined (e.g., summed with) the second image element brightness value, resulting in the adjusted brightness level for the second image element, comprised in the body-part relief print image. In this implementation, for example the adjusted brightness level for an image element may mitigate inappropriate "brightness" levels resulting from defects (e.g., internal or external) occurring during the body-part relief print image capture.

That is, for example, a weighted value (e.g., indicating a "brightness" difference level) may be indicated for the second image element, where the second image element is comprised in an area having an imaging defect (e.g., dirt, defective part, etc.). In this example, an image element from an area without a defect may comprise a weighted value of zero (e.g., no reduced brightness due to the defect). Further, as an example, the weighted value may indicate a difference in "brightness" level between an image element from a defective area and an image element from a non-defective area of the imaging device. When the weighted value is combined with the second image element brightness value from the unadjusted relief image, for example, the resulting brightness level of the image element may be more indicative of an area in the image that did not comprise a defect.

It will be appreciated that, "brightness" level is not limited to the implementations described above (e.g., on a color-scale). For example, brightness level may be indicated by a "gain" level in an image signal, where an increase in gain may result in an increase in brightness of at least a portion of the image. Further, it is anticipated that other image signal controls devised by those skilled in the art may be used to adjust, manage and/or control the "brightness" of one or more of the image elements of an image.

Having determined the adjusted brightness level for the second image element (e.g., and for the respective one or more image elements in the body-part relief print image), the exemplary implementation 200, of FIG. 2, ends at 210.

Figure 3:
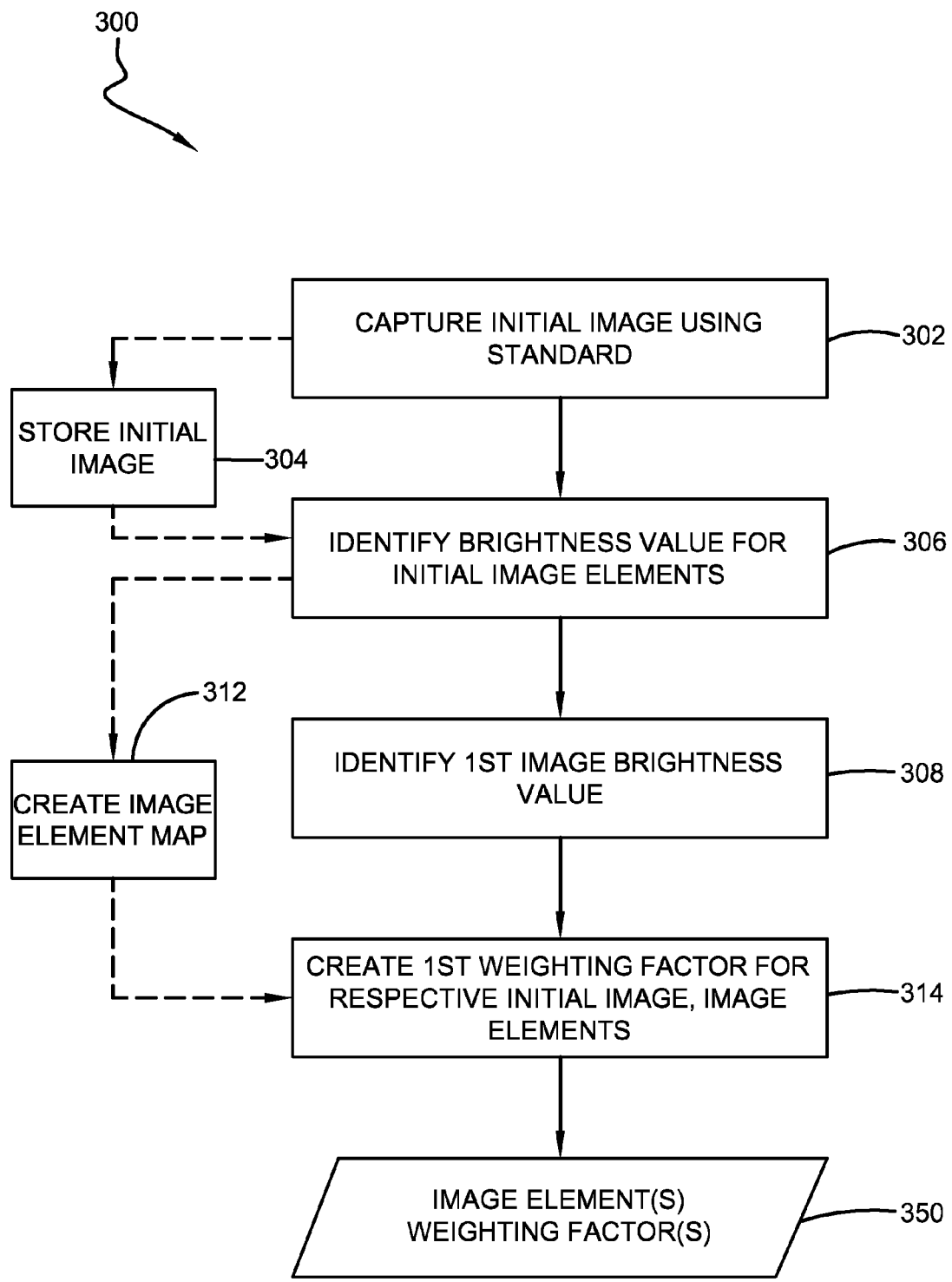
FIG. 3 is a flow diagram illustrating an example implementation where one or more portions of one or more techniques described herein may be implemented.

FIG. 3 is a flow diagram illustrating an example implementation 300 where one or more portions of one or more techniques described herein may be implemented. At 302, an initial image can be captured using a body-part relief print capture device standard in combination with a body-part relief print capture device. In one implementation, at 304, the initial image may be stored, such as in local memory (e.g., volatile and/or non-volatile) and/or storage (e.g., electronic data storage, such as disks, flash, etc.), and/or remote memory and/or storage. Further, in this implementation, metadata (e.g., type, size, time/date, storage location, etc.) associated with the initial image may be indexed in a database (e.g., for subsequent access).

As one example, a body-part relief print capture device standard may comprise a type of calibration standard piece that "stands-in" for a body-part (e.g., hand or finger) when capturing the initial image using the relief print capture device. In one implementation, a body-part relief print capture device standard may comprise a "blank" (e.g., featureless, without design, smooth, monochrome, etc.) that provides a type of clean "background" for the initial image. As an example, a blank background image (e.g., used as the initial image) may be used to identify potential deviations from an "ideal" image (e.g., one without defects) caused by external and/or internal conditions (e.g., environmental, dirt, defects in the capture device, etc.).

In one implementation, a fingerprint and/or handprint capture device may comprise an electro-luminescent portion that utilizes an electrical field to activate photon emitting substances. In this implementation, for example, the body-part relief print capture device standard may comprise a desired degree of permittivity, providing for a desired electrical field that allows the electro-luminescent portion to function appropriately. Further, in this implementation, the body-part relief print capture device standard may comprise a type of calibration blank, for example, which when placed in a "body-part" relief print capture location of the device, provides for capture of the initial image (e.g., a blank image). In one example, placing the body-part relief print capture device standard in the "body-part" relief print capture location may result in an activation of respective photon emitting substances in the electro-luminescent portion, thereby providing an initial image indicative of detected photons from an entire portion of the "body-part" relief print capture location (e.g., the entire initial image indicates light from the device).

At 306 in the example implementation 300, of FIG. 3, a first image element brightness value can be identified for a first image element. In one implementation, the first image element brightness value can comprise a color-scale value, such as a gray-scale value (e.g., a value from 0 to 255, inclusive). As one example, a digital image can comprise a plurality of image elements, such as pixels and/or sub-pixels, where an arrangement of the image elements and a brightness value is identified by data comprised in an image file that represents the image. In this implementation, for example, the image element brightness value may be identified for the first image element (e.g., and respective other image elements in the initial image) by accessing the data comprised in the image file (e.g., or some representation of the image thereof, such as stored locally and/or remotely) of the initial image.

In one implementation, at 312, in FIG. 3, an image element map may be created for the initial image. In this implementation, for example, the image element map may comprise a representation of respective image elements in the image, arranged according to their corresponding location in the image. Further, in this example, respective image element representations may be associated with their corresponding image element brightness value. As an illustrative example, an image element map may comprise a twenty-five square grid (e.g., five by five), where respective square represent and image element from the image. Additionally, in this example, respective grid squares can comprise (e.g., be linked to) their corresponding image element brightness value. In one implementation, the initial image, image element map may be stored (e.g., locally and/or remotely), and/or indexed to a database.

At 308 in the example implementation 300, of FIG. 3, a first image brightness value can be identified. In one implementation, the first image brightness value can comprise a desired value from a set of values comprising one or more image element brightness values, respectively corresponding to an image element in the initial image. In one implementation, the set of image element brightness values may comprise values corresponding to image elements from at least a portion of the initial image. Further, the desired value may comprise a highest value from the set.

As an example, one or more first image elements in the initial image may indicate a highest (e.g., ideal) potential brightness value, such as where the one or more first image elements are from an area of the image without an apparent image defect. Additionally, in this example, one or more second image elements may indicate less than the highest potential brightness value, such as where the one or more second image elements are from an area of the image comprising an apparent image defect. In this example, the first image brightness value may be identified as the highest brightness value comprised in the set of values comprising one or more first image element brightness values.

At 314 in the example implementation 300, of FIG. 3, a first weighting factor 350 can be determined for the first image element (e.g., and respective other image elements in the initial image). In one implementation, determining the first weighting factor 350 can comprise combining the identified first image brightness value (e.g., at 308) for the initial image with the first image element brightness value for the first image element (e.g., at 306).

Figure 4:
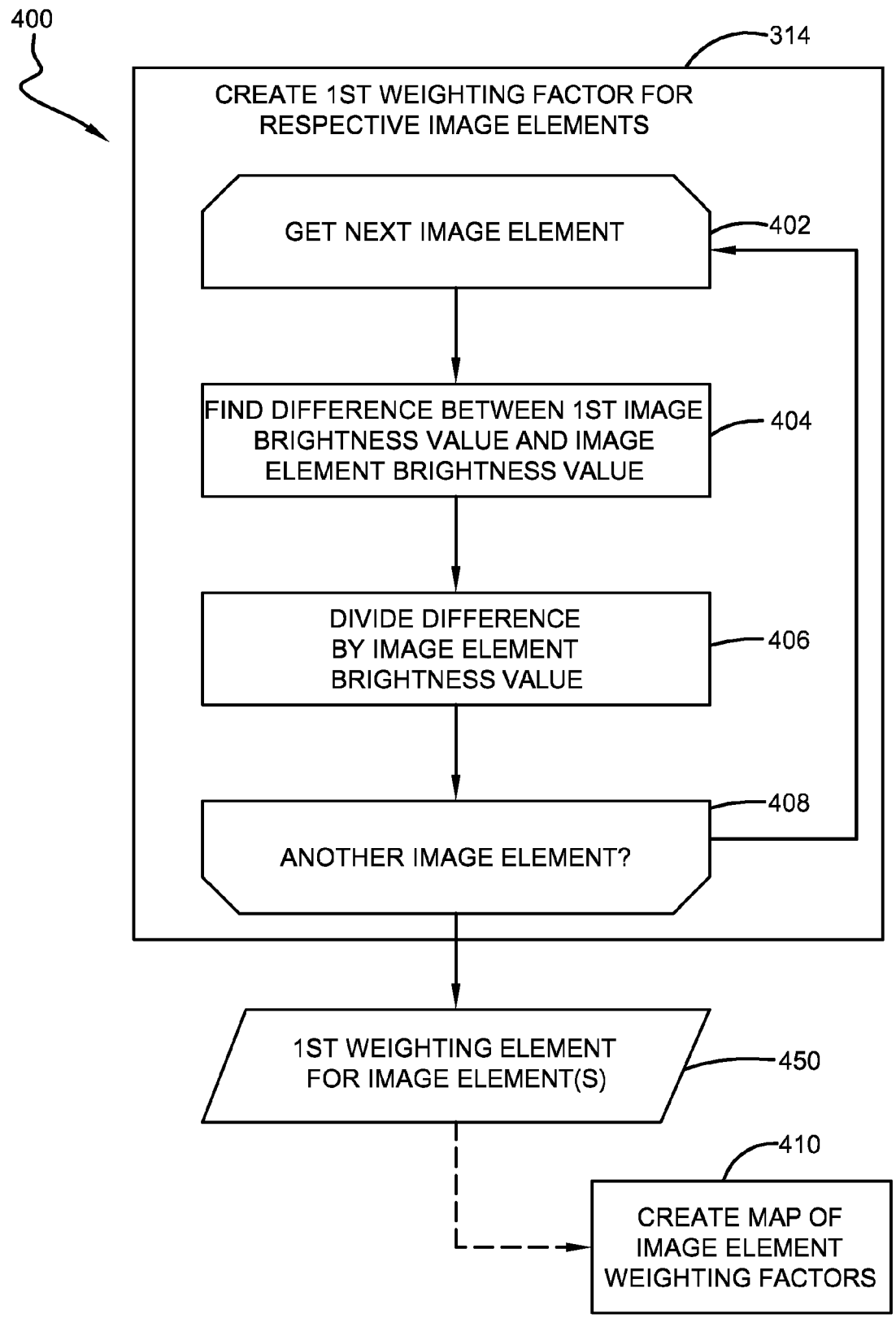
FIG. 4 is a flow diagram illustrating an example implementation where one or more portions of one or more techniques described herein may be implemented.

FIG. 4 is a flow diagram illustrating an example implementation 400 where one or more portions of one or more techniques described herein may be implemented. In this implementation 400, at 314, a first weighting factor 450 (e.g., 350 of FIG. 3) may be determined for respective image elements in the initial image, starting at 402, by combining the identified first image brightness value with the first image element brightness value. At 404, determining the first weighting factor 450 can comprise determining a difference between the first image brightness value and the first image element brightness value. Further, at 406, a quotient of the difference and the first image element brightness value may be determined (e.g., dividing the difference by the first image element brightness value).

As an illustrative example, where the first image brightness value is two hundred and forty, and the first image element brightness value is one hundred, the first weighting factor 350 may be determined as follows:

$$(240-100)/100=1.4 \text{(first weighting factor)}.$$

Further, the first weighting factor 450 may be determined for the respective image elements in the initial image, where a next image element from the initial image can be selected, at 408, and iterated through the process 402 to 408, at least until no more image elements are available for the initial image. In one implementation, at 410, an image element weighting map may be created for the initial image (e.g., a first weighting map), for example, where the image element weighting map may comprise a first weighting factor for respective image elements.

Figure 5:
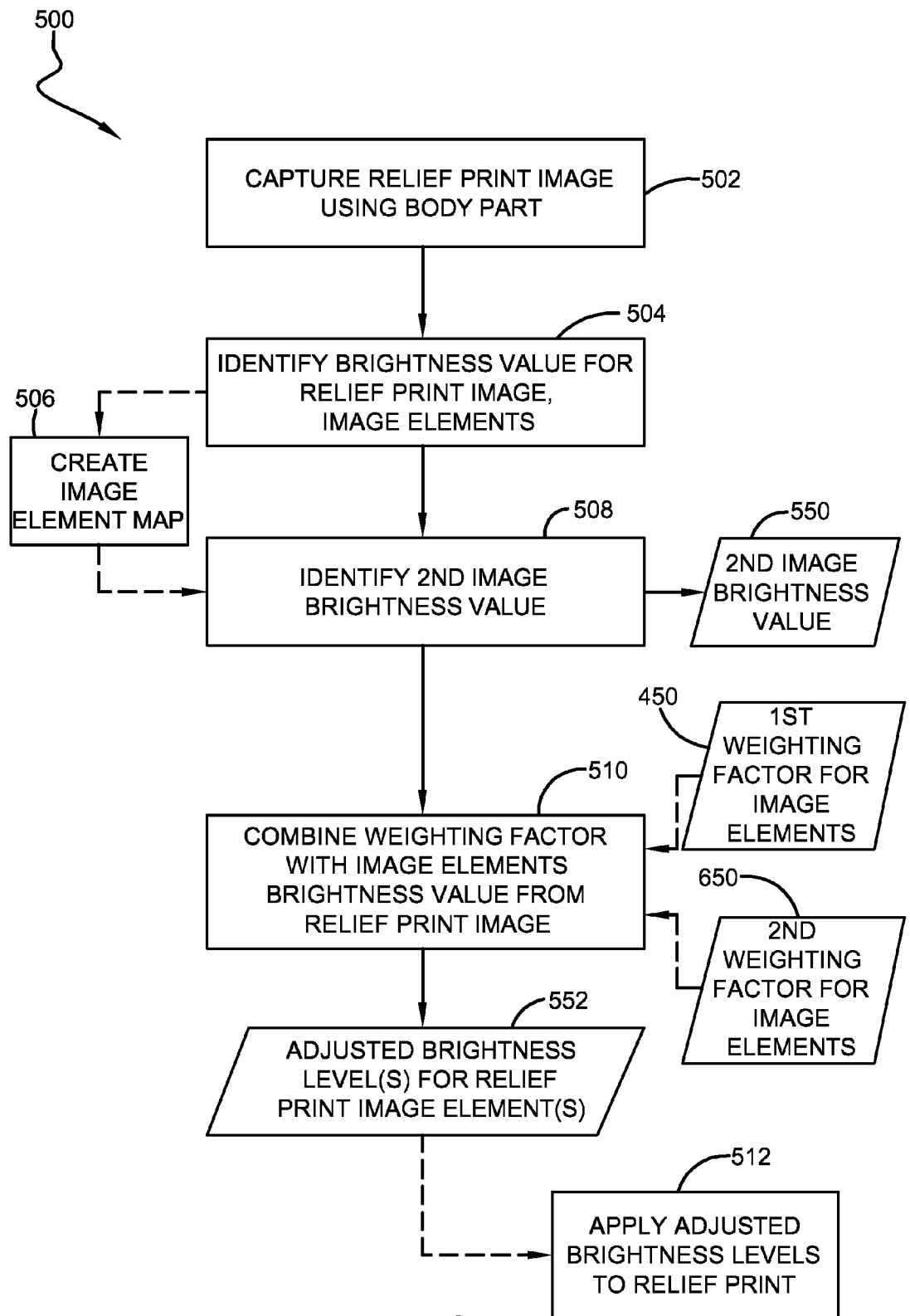
FIG. 5 is a flow diagram illustrating an example implementation where one or more portions of one or more techniques described herein may be implemented.

FIG. 5 is a flow diagram illustrating an example implementation 400 where one or more portions of one or more techniques described herein may be implemented. At 502 in the example implementation 500, a body-part relief print image can be captured using a body-part relief print capture device (e.g., a same device as in 302 of FIG. 3), where the body-part relief print image comprises an image of a body-part relief print (e.g., a fingerprint or handprint) from at least a portion of a body (e.g., hand or finger). As one example, an initial image may be captured prior to capturing the body-part relief print image, using the same image capture device. In this way, for example, the initial image and the body-part relief print image may comprise similar image defects (e.g., due to external and/or internal device conditions), if present at all.

At 504 in FIG. 5, a second image element brightness value can be identified for a second image element, comprised in the body-part relief print image. In one implementation the second image element brightness value can comprise a color-scale value (e.g., a gray-scale value) for the second image element in the body-part relief print image. As one example, as described above value (e.g., at 306 of FIG. 3), the second image element brightness value may be identified for the second image element (e.g., and respective other image elements in the body-part relief print image) by accessing the data comprised in an associated image file (e.g., or some representation of the image thereof, such as stored locally and/or remotely) of the body-part relief print image. Further, for example, a second image element brightness value may be identified for respective image elements in the body-part relief print image.

In one implementation, at 506, an image element map of the body-part relief print image may be created. In this implementation, for example, the respective mapped image elements may be associated with their corresponding second image element brightness value. As another example, one or more image elements in the body-part relief print image may comprise a lower brightness value (e.g., from areas with an image defect) than other image elements. In this example, the image element map of the body-part relief print image may indicate those areas with and without potential image defects. In one implementation, a location of the first image element in said initial image may correspond to a same image location as a location of the second image element in said body-part relief print image. That is, for example, the first and second image elements may represent a same pixel in the respective images captured from a same device.

Figure 7A:
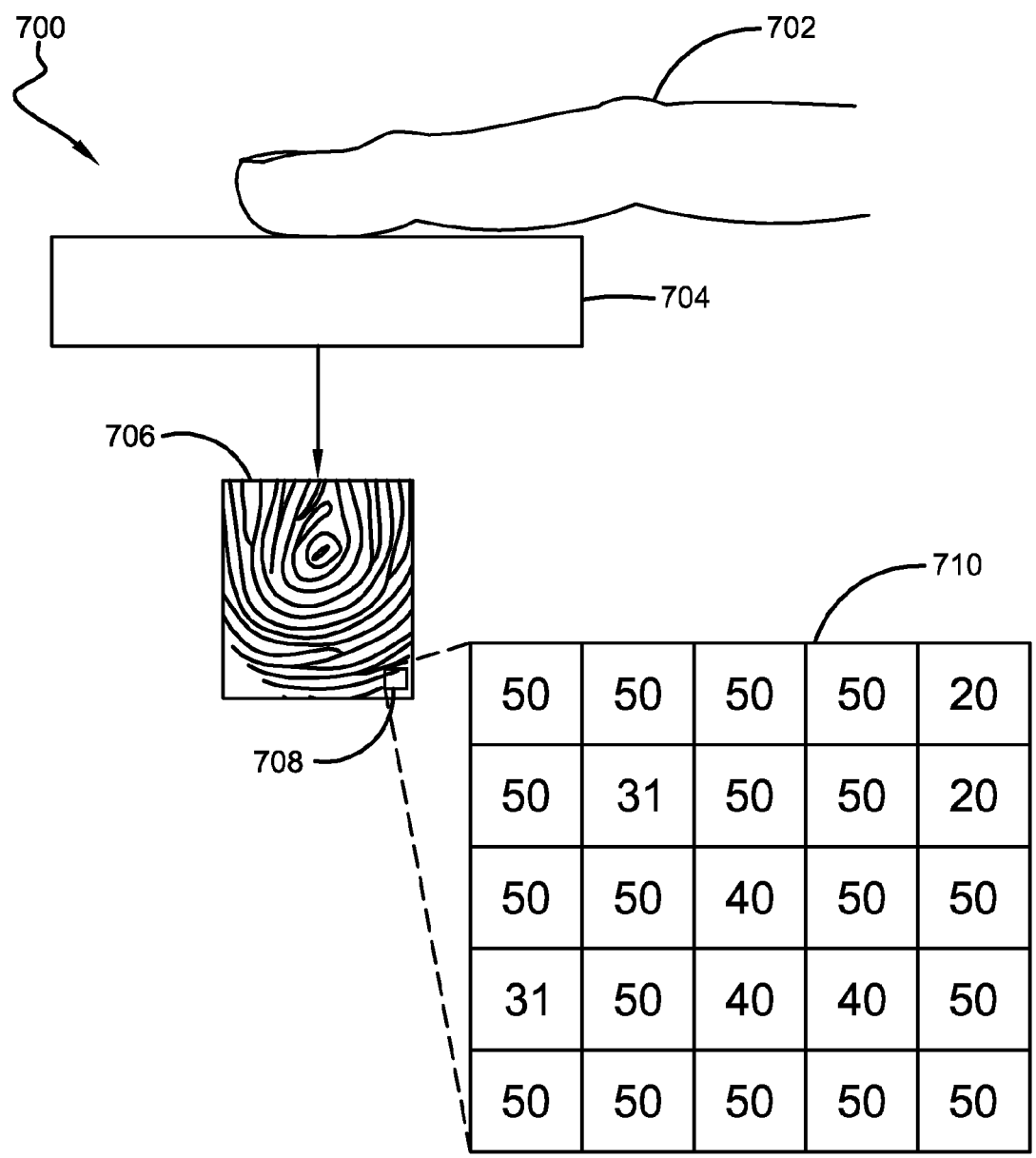
FIGS. 7A and 7B illustrate example implementations where one or more portions of one or more techniques described herein may be implemented.

As an illustrative example, FIG. 7A illustrates an example implementation 700 where one or more portions of one or more techniques described herein may be implemented. In this example implementation 700, a body-part relief print image capture device 704 is used to capture a relief print image 706 of a body part 702. As an example, a person may place one of their fingers on a fingerprint capture portion of a fingerprint capture device, which activates an image capture event, resulting in an image of at least a portion of the fingerprint.

Further, in this illustrative example 700, a relief print image 706 may comprise one or more representations of ridges (e.g., indicated in the image by dark lines, although a reverse version of the image may indicate the ridges as light lines, such as captured using an electro-luminescent device) and valleys (e.g., between ridges). In this implementation, a portion of one or the ridges 708 may comprise a plurality of image elements, for which an image element map 710 may be created (e.g., 506 of FIG. 5). This example of an image element map 710 comprises a five by five grid, comprising twenty-five image elements arranged in a square grid pattern (e.g., although other arrangements may be used).

In this example 700, respective grid squares in the image element map 710 comprise an associated second image element brightness value, which may correspond to a brightness (e.g., or color-scale) level represented by that image element in the image 706. In this example, a highest brightness value is fifty, associated with several image elements, while other values include forty, thirty-one and twenty. As one example, the values lower than fifty may indicate areas of the image that were affected by some external and/or internal device conditions, resulting in an image defect.

Returning to FIG. 5, at 508, a second image brightness value 550 can be identified. As described above (e.g., at 308 or FIG. 3), in one implementation, the second image brightness value 550 can comprise a desired value from a set of values comprising one or more second image element brightness values, respectively corresponding to an image element in the body-part relief print image. In one implementation, the set of image element brightness values may comprise values corresponding to image elements from at least a portion of the body-part relief print image. Further, the desired value may comprise a highest value from the set. In one example, the second image brightness value 550 may be identified as the highest brightness value comprised in the set of values comprising one or more second image element brightness values.

Figure 6:
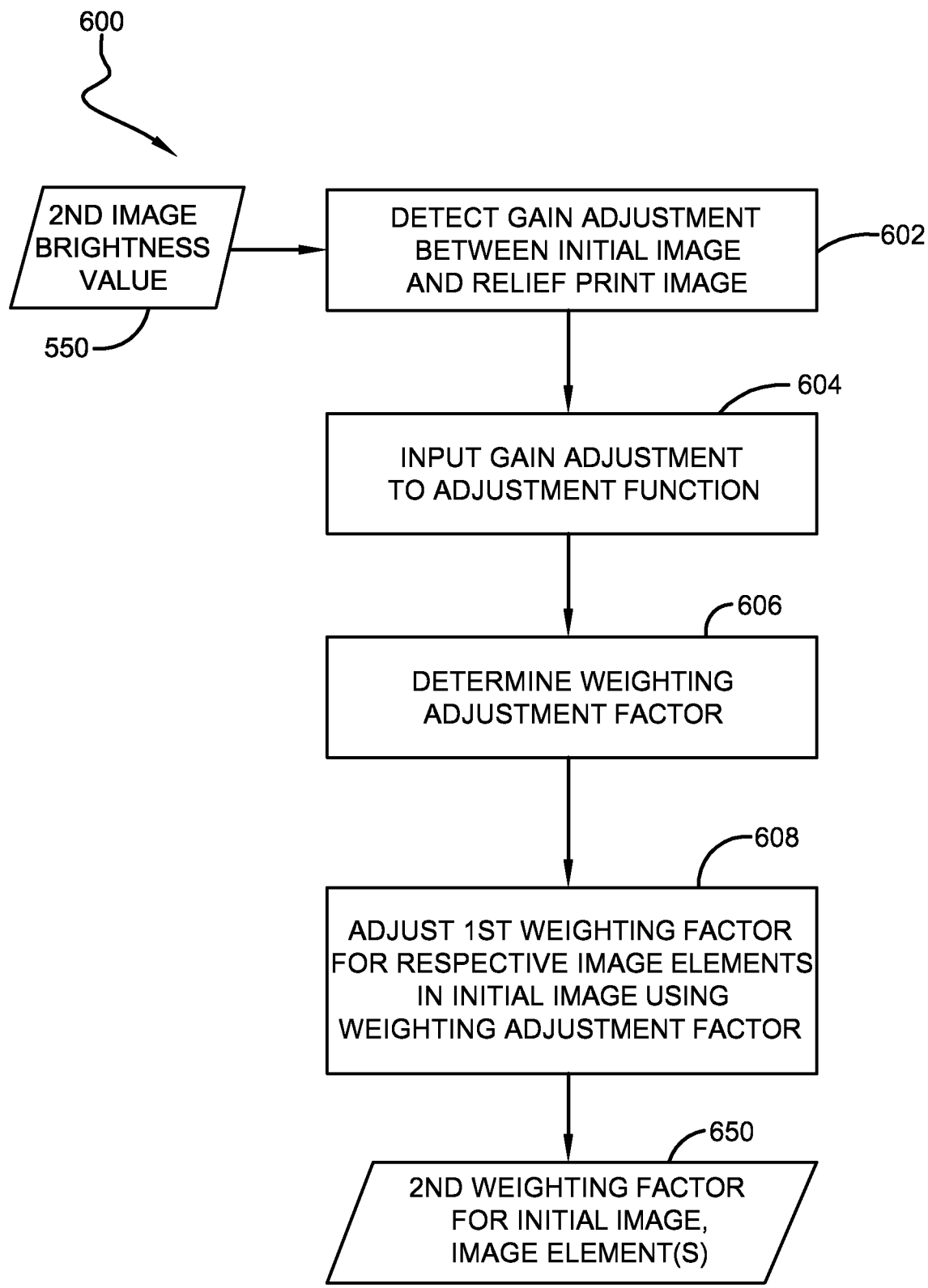
FIG. 6 is a flow diagram illustrating an example implementation where one or more portions of one or more techniques described herein may be implemented.

FIG. 6 is a flow diagram illustrating an example implementation 600 where one or more portions of one or more techniques described herein may be implemented. In this implementation 600, the second image brightness value 550 may be used to detect a gain adjustment between the initial image capture and the body-part relief print image capture, at 602. As one example, a "brightness" level may be adjusted by adjusting a "gain" level for an image capture device, where an increase in gain may result in an increase in brightness of at least a portion of a captured image. For example, signal amplifiers may be used to adjust portions of signal levels detected by sensors in the image capture device. In this example, adjusting a brightness gain may adjust the amplification of a brightness portion of the detected signal levels (e.g., either up or down). In one implementation, a brightness level of a signal detected for a body-part relief print may be different (e.g., lower or higher) than that of the initial image (e.g., either manually adjusted or automatically detected and adjusted). In one example, the brightness level of a signal detected for a body-part relief print may be lower than the initial image, and the gain may be adjusted up in an attempt to amplify the brightness portion of the detected signal.

At 604 in the example implementation 600 of FIG. 6, a gain adjustment function may be applied to the detected gain adjustment. In one implementation, the gain adjustment function may be indicative of a relationship between the gain adjustment, between the initial image and the body-part relief print image, and weighting value variation resulting from the adjustment in gain. That is, for example, when the brightness gain is adjusted a corresponding adjustment may be needed in the weighting factor (e.g., first weighting factor) to account for a difference in gain. In one implementation, the gain adjustment function may be predetermined, for example, based on intrinsic evidence, and/or may be determined ad-hoc based on existing conditions (e.g., at a time of image capture).

Figure 7B:
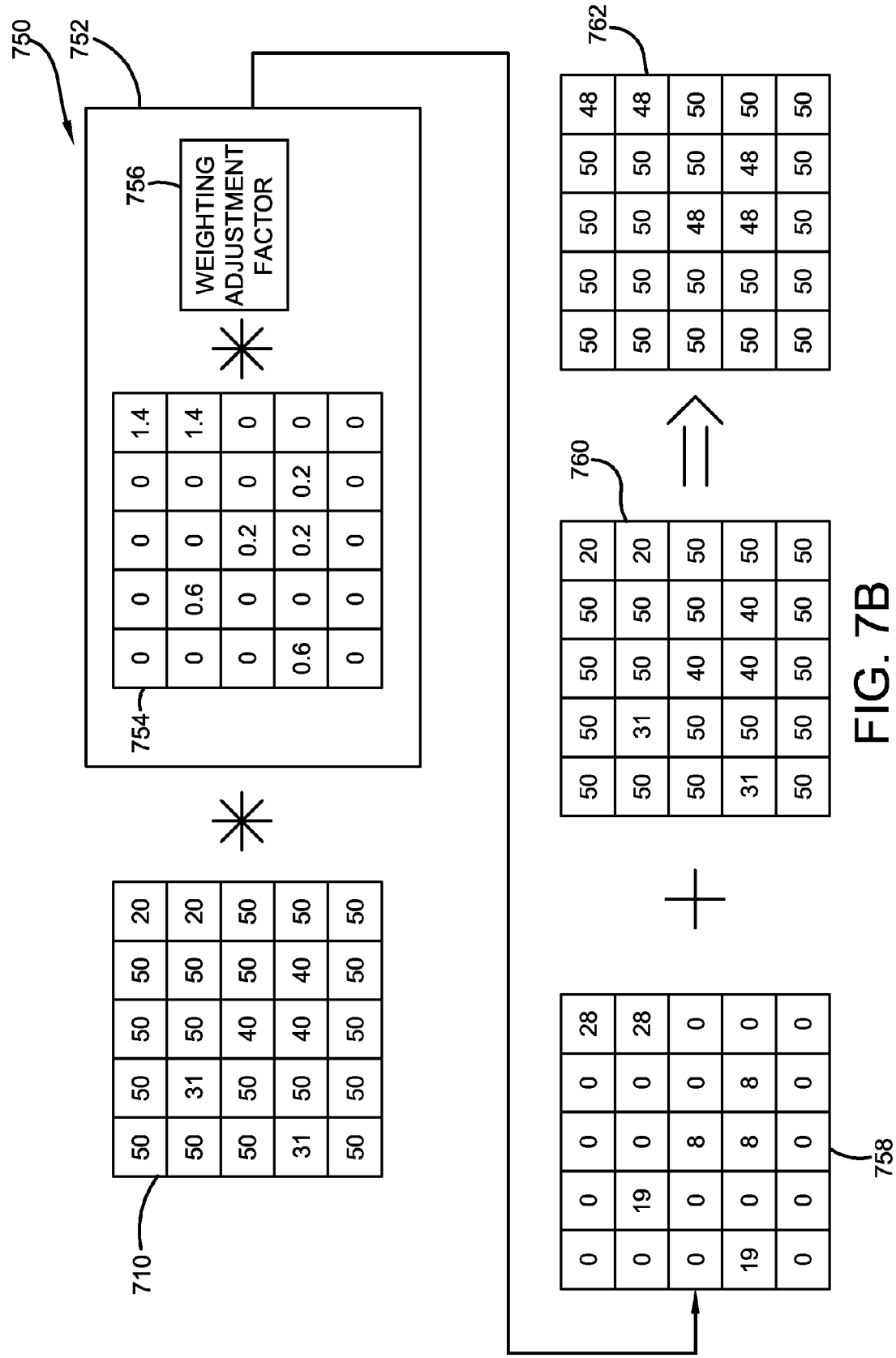

At 606, a weighting adjustment factor is determined, resulting from the application of the gain adjustment function to the detected gain adjustment. At 608, the first weighting factor (e.g., 350 of FIG. 3) can be adjusted for the first image element using the weighting adjustment factor, resulting in a second weighting factor 650 for the first image element. Further, for example, a second weighting factor 650 may be determined for respective weighting factors associated with a first image element in the initial image, using the weighting adjustment factor. As an illustrative example, FIG. 7B illustrates example implementation 750 where one or more portions of one or more techniques described herein may be implemented. A first weighting factor image element map 754 indicates respective first weighting factors (e.g., 0, 0.2, 0.6, 1.4) associated with the image elements in the image element map 754. In this illustrative example 750, the respective first weighting factors may be multiplied by the weighting adjustment factor 756, resulting in a second weighting factor 650 for the respective image elements.

Returning to FIG. 5, at 510, a weighting factor (e.g., the first weighting factor 450 or the second weighting factor 650) may be combined with the second image element brightness value from the body-part relief print image. As one example, if no gain adjustment is detected (e.g., 602 of FIG. 6) between the initial image and the body-part relief print image capture events, the first weighting factor 450 may be combined with the second image element brightness value (e.g., or the second weighting factor 650 may be used if produces a same result as the first weighting factor 450, such as multiplying a number by one). In another implementation, if a gain adjustment is detected the second weighting factor 650 may be combined with the second image element brightness value.

As an illustrative example, in FIG. 7B, where the weighting adjustment factor 756 is one, a resulting second weighting factor (for respective associated image elements) from the combination 752 (e.g., multiplication) of the weighting adjustment factor 756 and the respective first weighting factors 754 may be represented by the same numbers indicated in the first weighting factor map 754. In this example, the second image element brightness value for the respective body-part relief print image, image elements 710 may be combined with (e.g., multiplied by) the corresponding second weighting factor 752, resulting in a body-part relief print weighting value 758 for the respective second image elements of the body-part relief print image. Further, in this example 750, the respective body-part relief print weighting value 758 can be combined (e.g., summed) with their corresponding second image element brightness value 760 from the body-part relief print image. A result of this combination comprises an adjusted brightness level 762 for the respective image elements corresponding to the body-part relief image.

Returning to FIG. 5, at 512, the respective image element adjusted brightness level 552 may be applied to their corresponding second image element in the body-part relief print image, resulting in an adjusted body-part relief print image. As an illustrative example, in FIG. 7B, two image elements in a top left corner of the image element map 710, representing at least a portion of the body-part relief print image, comprise a brightness level of twenty. In one example, lowered (e.g., lowered from a highest level fifty in the portion of the image 710) brightness may be a result of a defect in the image capture device, and/or debris on an image capture surface of the image capture device. In this example, the application of the weighting factor (e.g., first or second) to the respective, two second image element brightness values (e.g., in the top left corner of 710) results an adjusted brightness level of forty-eight in the adjusted body-part relief print image 762.

A system may be devised that can mitigate image defects in a body-part relief print image, such as a fingerprint image, produced by an image capture device, such as a fingerprint scanner. As an example, an imaging defect may be indicated by a variation in brightness between neighboring image elements (e.g., pixels or sub-pixels) in a resulting image, where the defect can be caused by external and/or internal device conditions.

Figure 8:
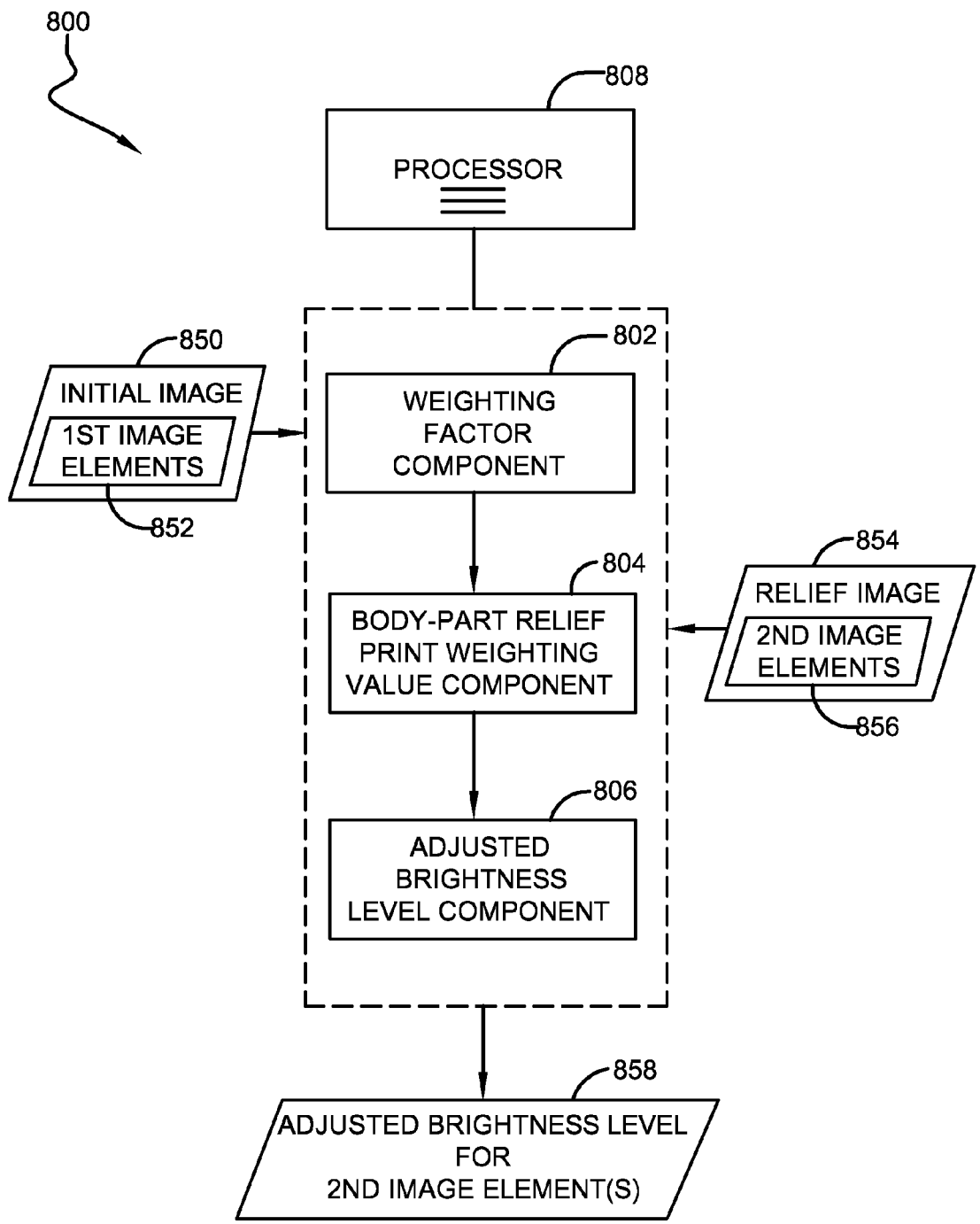
FIG. 8 is a component diagram illustrating an exemplary system for identifying an adjusted brightness level for an image element in an image.

FIG. 8 is a component diagram illustrating an exemplary system 800 for identifying an adjusted brightness level for an image element in an image. In the exemplary implementation 800, a weighting factor component 802 is configured to determine a first weighting factor for a first image element 852 comprised in an initial image 850. Further, a body-part relief print weighting value component 804 is operably coupled with the weighting factor component 802. The body-part relief print weighting value component 804 is configured to determine a body-part relief print weighting value, based at least upon a combination of the first weighting factor and a second image element brightness value for a second image element 856 comprised in a body-part relief print image 854.

In the exemplary implementation 800, of FIG. 8, an adjusted brightness level component 806 is operably coupled with the body-part relief print weighting value component 804. The adjusted brightness level component 806 is configured to determine the adjusted brightness level for the second image element 856, based at least upon a combination of the body-part relief print weighting value and the second image element brightness value. Further, at least a portion of the system is implemented, at least in part, via a processing unit 808.

Figure 9:
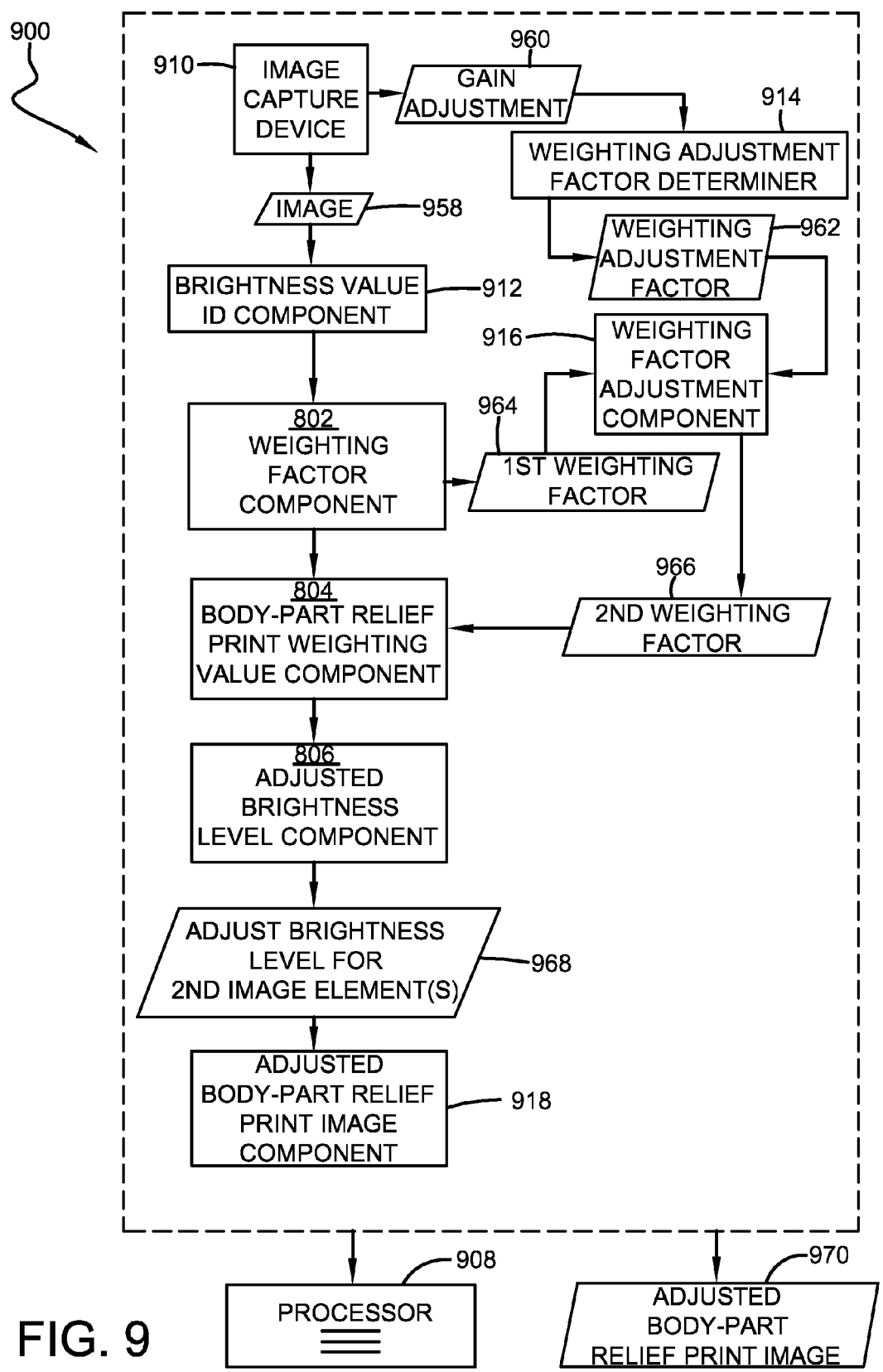
FIG. 9 is a component diagram illustrating an example implementation where one or more portions of systems described herein may be implemented.

FIG. 9 is a component diagram illustrating an example implementation 900 where one or more portions of systems described herein may be implemented. In this example 900, an extension of FIG. 8 is provided and thus description of elements, components, etc. described with respect to FIG. 8 may not be repeated for simplicity. In the example implementation 900, a body-part relief print image capture device 910 can be configured to capture the initial image 958, where the initial image 958 may comprise an image of at least a portion of a body-part relief print capture device standard. Further, the body-part relief print image capture device 910 can be configured to capture the body-part relief print image 958, where the body-part relief print image 958 may comprise an image of a body-part relief print from at least a portion of a body.

In the example implementation 900, a brightness value identification component 912 can be configured to identify a first image element brightness value 950 for a first image element in the initial image 958. In one implementation, the first image element brightness value 950 may comprise a color-scale value (e.g., a gray-scale value). Further, the brightness value identification component 912 can be configured to identify a second image element brightness value 954 for said second image element in the body-part relief image 958. In one implementation, the second image element brightness value 954 may comprise a color-scale value. Additionally, the brightness value identification component 912 can be configured to identify a first image brightness value 952. In one implementation, the first image brightness value 952 may comprise a first desired value from a first set comprising one or more image element brightness values respectively corresponding to an image element in the initial image. The brightness value identification component 912 can also be configured to identify a second image brightness value 956. In one implementation, the second image brightness value 956 may comprise a second desired value from a second set comprising one or more image element brightness values respectively corresponding to an image element in at least a portion of said body-part relief print image.

In the example implementation 900, a weighting adjustment factor determination component 914 can be configured to determine a weighting adjustment factor 962. The weighting adjustment factor determination component 914 may determine a weighting adjustment factor 962 by applying a detected gain adjustment 960 to a desired weighting adjustment function. The detected gain adjustment 960 may comprise a difference in gain applied to the body-part relief print image capture device 910, between the capture of the initial image 958 and the capture of the body-part relief print image 958.

In the example implementation 900, a weighting factor adjustment component 916 can be configured to adjust the first weighting factor 964 for the first image element using the weighting adjustment factor 962, resulting in a second weighting factor 966 for the first image element. In this implementation, the body-part relief print weighting value component 804 can be configured to determine the body-part relief print weighting value by combining the second weighting factor 966 and the second image element brightness value 954 from the body-part relief print image 958.

The example implementation 900 further comprises an adjusted body-part relief print image component 918. The adjusted body-part relief print image component 918 may be configured to applying the adjusted brightness level 968, associated with the respective second image elements of the body-part relief print image 958, to the respective second image elements, resulting in an adjusted body-part relief print image 970. That is, for example, the resulting adjusted body-part relief print image 970 may provide an image of the relief print with mitigated image defects, resulting from external and/or internal conditions affecting the body-part relief image capture device 910.

Figure 10:
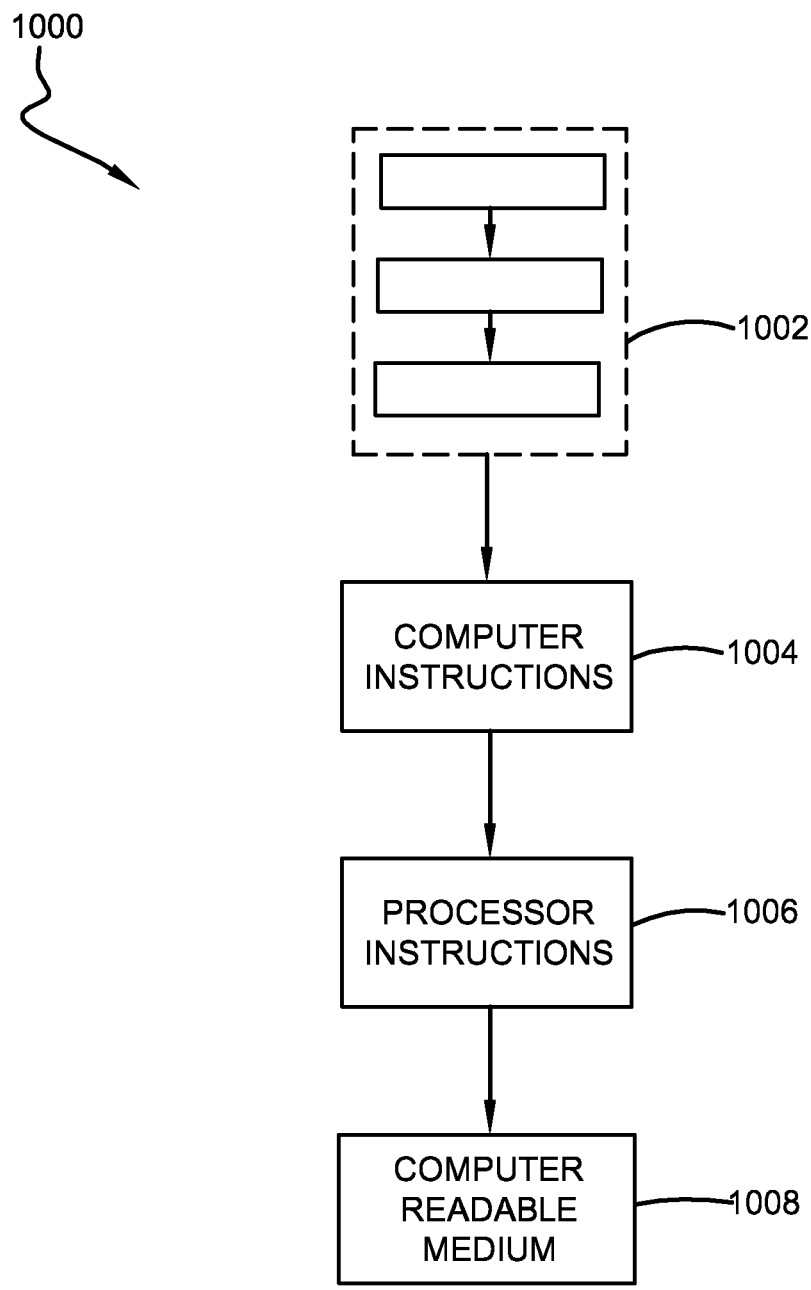
FIG. 10 is an illustration of an exemplary computer-readable medium comprising processor-executable instructions configured to embody one or more of the provisions set forth herein.

In another implementation, a computer-readable medium may comprise processor-executable instructions that can be configured to implement one or more portions of the one or more techniques presented herein. An example computer-readable medium is illustrated in FIG. 10, where the implementation 1000 comprises a computer-readable medium 1008 (e.g., a CD-R, DVD-R, a hard disk drive, flash-drive, non-volatile memory storage component), on which is encoded computer-readable data 1006. This computer-readable data 1006 in turn comprises a set of computer instructions 1004 that can be configured to operate in accordance with one or more of the techniques set forth herein. In one such implementation 1002, the processor-executable instructions 1004 may be configured to perform a method, such as at least some of the exemplary method 100 of FIG. 1. In another such implementation, the processor-executable instructions 1004 may be configured to implement a system, such as at least some of the exemplary system 800 of FIG. 8. Many such computer-readable media may be devised by those of ordinary skill in the art that are configured to operate in accordance with the techniques presented herein.

Figure 11:
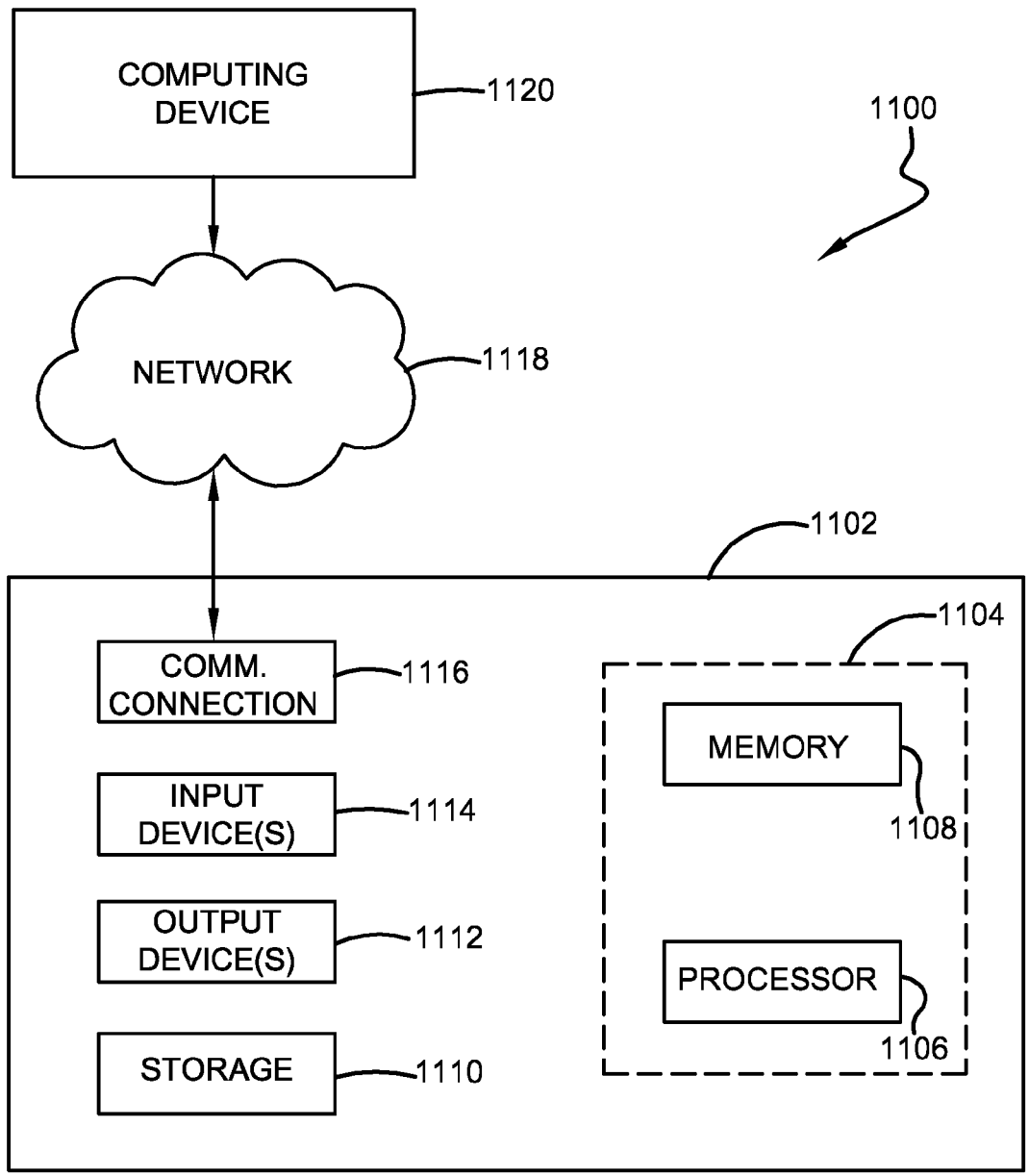
FIG. 11 illustrates an exemplary computing environment wherein one or more of the provisions set forth herein may be implemented.

FIG. 11 and the following discussion provide a brief, general description of a computing environment in/on which one or more or the implementations of one or more of the methods and/or system set forth herein may be implemented. The operating environment of FIG. 11 is merely an example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, mobile consoles, tablets, media players, and the like), multiprocessor systems, consumer electronics, mini computers, mainframe computers, distributed computing environments that include any of the above systems or devices, and the like.

Although not required, implementations are described in the general context of "computer readable instructions" executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 illustrates an example of a system 1100 comprising a computing device 1102 configured to implement one or more implementations provided herein. In one configuration, computing device 1102 includes at least one processing unit 1106 and memory 1108. Depending on the exact configuration and type of computing device, memory 1108 may be volatile (such as RAM, for example), non-volatile (such as ROM, flash memory, etc., for example) or some combination of the two. This configuration is illustrated in FIG. 11 by dashed line 1104.

In other implementations, device 1102 may include additional features and/or functionality. For example, device 1102 may also include additional storage (e.g., removable and/or non-removable) including, but not limited to, magnetic storage, optical storage, and the like. Such additional storage is illustrated in FIG. 11 by storage 1110. In one implementation, computer readable instructions to implement one or more implementations provided herein may be in storage 1110. Storage 1110 may also store other computer readable instructions to implement an operating system, an application program and the like. Computer readable instructions may be loaded in memory 1108 for execution by processing unit 1106, for example.

The term "computer readable media" as used herein includes computer storage media. Computer storage media includes volatile and nonvolatile, removable and non-removable media implemented in any method or technology for storage of information such as computer readable instructions or other data. Memory 1108 and storage 1110 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1102. Any such computer storage media may be part of device 1102.

Device 1102 may also include communication connection(s) 1116 that allows device 1102 to communicate with other devices. Communication connection(s) 1116 may include, but is not limited to, a modem, a Network Interface Card (NIC), an integrated network interface, a radio frequency transmitter/receiver, an infrared port, a USB connection or other interfaces for connecting computing device 1102 to other computing devices. Communication connection(s) 1116 may include a wired connection or a wireless connection. Communication connection(s) 1116 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1102 may include input device(s) 1104 such as keyboard, mouse, pen, voice input device, touch input device, infrared cameras, video input devices, and/or any other input device. Output device(s) 1112 such as one or more displays, speakers, printers, and/or any other output device may also be included in device 1102. Input device(s) 1114 and output device(s) 1112 may be connected to device 1102 via a wired connection, wireless connection, or any combination thereof. In one implementation, an input device or an output device from another computing device may be used as input device(s) 1114 or output device(s) 1112 for computing device 1102.

Components of computing device 1102 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another implementation, components of computing device 1102 may be interconnected by a network. For example, memory 1108 may be comprised of multiple physical memory units located in different physical locations interconnected by a network.

Those skilled in the art will realize that storage devices utilized to store computer readable instructions may be distributed across a network. For example, a computing device 1120 accessible via network 1118 may store computer readable instructions to implement one or more implementations provided herein. Computing device 1102 may access computing device 1120 and download a part or all of the computer readable instructions for execution. Alternatively, computing device 1102 may download pieces of the computer readable instructions, as needed, or some instructions may be executed at computing device 1102 and some at computing device 1120.

Various operations of implementations are provided herein. In one implementation, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each implementation provided herein.

Moreover, the word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processor, an object, an executable, a thread of execution, a program and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device, carrier or media. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A method for identifying an adjusted brightness level for an image element representing at least a portion of an image of a body-part relief print, comprising:
    determining a first calibration weighting factor for a first image element comprised in a calibration image;
    determining a body-part relief print weighting value for a second image element based at least upon a combination of the first calibration weighting factor and a second image element brightness value from the second image element comprised in a body-part relief print image, the second image element in the body-part relief image corresponding to the first image element in the calibration image; and
    determining an adjusted brightness level for the second image element in the body-part relief image based at least upon a combination of the body-part relief print weighting value and the second image element brightness value, at least a portion of the method implemented at least in part via a processor.

2. The method of claim 1, further comprising capturing the calibration image using a body-part relief print capture device calibration standard in combination with a body-part relief print capture device.

3. The method of claim 2, further comprising capturing said body-part relief print image using said body-part relief print capture device, wherein said body-part relief print image comprises an image of a body-part relief print from at least a portion of a body, wherein the body-part relief print comprises one or more of:
    a fingerprint; and
    a handprint.

4. The method of claim 1, determining the first calibration weighting factor for the first image element comprising combining an identified calibration image brightness value for the calibration image with a first image element brightness value from the first image element.

5. The method of claim 4, combining the identified calibration image brightness value for the calibration image with the first image element brightness value from the first image element comprising one or more of:
    determining a difference between the calibration image brightness value and the first image element brightness value; and
    determining a quotient of the difference and the first image element brightness value.

6. The method of claim 4, comprising identifying the calibration image brightness value, comprising identifying a desired value from a set comprising one or more image element brightness values respectively corresponding to an image element in the calibration image.

7. The method of claim 4, further comprising identifying said first image element brightness value for said first image element, wherein the first image element brightness value comprises a color-scale value.

8. The method of claim 1, comprising one or more of:
    adjusting the calibration weighting factor for the first image element using a weighting adjustment factor, resulting in a second calibration weighting factor for the first image element; and
    determining the body-part relief print weighting value, comprising combining the second calibration weighting factor and the second image element brightness value.

9. The method of claim 8, determining said weighting adjustment factor for said first image element based at least upon a gain adjustment between said initial image and said body-part relief print image.

10. The method of claim 9, determining said weighting adjustment factor for said first image element further comprising applying a weighting adjustment function to said gain adjustment.

11. The method of claim 1, further comprising identifying said second image element brightness value, wherein the second image element brightness value comprises a color-scale value for the second image element in said body-part relief print image.

12. The method of claim 11, wherein a first image element location in said initial image corresponds to a same image location as a second image element location in said body-part relief print image.

13. The method of claim 1, further comprising applying said adjusted brightness level to said second image element resulting in an adjusted body-part relief print image.

14. A system for identifying an adjusted brightness level for an image element representing at least a portion of an image of a body-part relief print, comprising:
    a weighting factor component configured to determine a first calibration weighting factor for a first image element comprised in a calibration image;
    a body-part relief print weighting value component, operably coupled with the weighting factor component, and configured to determine a body-part relief print weighting value for a second image element based at least upon a combination of the first calibration weighting factor and a second image element brightness value for the second image element comprised in a body-part relief print image, the second image element in the body-part relief image corresponding to the first image element in the calibration image; and
    an adjusted brightness level component, operably coupled with the body-part relief print weighting value component, and configured to determine an adjusted brightness level for the second image element in the body-part relief image based at least upon a combination of the body-part relief print weighting value and the second image element brightness value, at least a portion of the system implemented at least in part via a processor.

15. The system of claim 14, comprising a body-part relief print image capture device configured to capture one or more of:
- the calibration image, the calibration image comprising an image of at least a portion of a body-part relief print capture device calibration standard; and
- the body-part relief print image, the body-part relief print image comprising an image of a body-part relief print from at least a portion of a body, wherein the portion of a body comprises one or more of:
  - a finger; and
  - a hand.

16. The system of claim 14, further comprising a brightness value identification component configured to perform one or more of:
- identify a first image element brightness value for said first image element, wherein the first image element brightness value comprises a color-scale value;
- identify said second image element brightness value for said second image element, wherein the second image element brightness value comprises a color-scale value for the second image element in said body-part relief print image;
- identify a first image brightness value comprising a first desired value from a first set, wherein the first set comprises one or more image element brightness values respectively corresponding to an image element in said initial image; and
- identify a second image brightness value comprising a second desired value from a second set, wherein the second set comprises one or more image element brightness values respectively corresponding to an image element in at least a portion of said body-part relief print image.

17. The system of claim 14,
comprising a weighting factor adjustment component configured to adjust the first calibration weighting factor for the first image element using a weighting adjustment factor, resulting in a second calibration weighting factor for the first image element; and
the body-part relief print weighting value component configured to determine the body-part relief print weighting value by combining the second calibration weighting factor and the second image element brightness value.

18. The system of claim 17, further comprising a weighting adjustment factor determination component configured to determine said weighting adjustment factor by applying a detected gain adjustment, between said initial image and said body-part relief print image, to a desired weighting adjustment function.

19. The system of claim 14, further comprising an adjusted body-part relief print image component configured to applying said adjusted brightness level to said second image element resulting in an adjusted body-part relief print image.

20. A non-transitory computer storage medium comprising computer executable instructions that when executed via a processor perform a method for identifying an adjusted brightness level for an image element representing at least a portion of an image of a body-part relief print, comprising:
- capturing an initial image using a body-part relief print capture device standard in combination with a body-part relief print capture device;
- determining a first weighting factor for a first image element comprised in said initial image, wherein the determining said first weighting factor for said first image element comprises combining an identified first image brightness value for said initial image with a first image element brightness value for said first image element;
- capturing a body-part relief print image using said body-part relief print capture device, wherein said body-part relief print image comprises an image of a body-part relief print from at least a portion of a body;
- adjusting said first weighting factor for said first image element using a weighting adjustment factor, wherein said weighting adjustment factor is based at least upon a gain adjustment between said initial image and said body-part relief print image, resulting in a second weighting factor for said first image element;
- determining a body-part relief print weighting value based at least upon a combination of said second weighting factor and a second image element brightness value identified for a second image element comprised in said body-part relief print image; and
- determining said adjusted brightness level for said second image element based at least upon a combination of said body-part relief print weighting value and said second image element brightness value, at least a portion of the method implemented at least in part via a processing unit.

* * * * *